United States Patent [19]
McLaughlin et al.

[11] Patent Number: 6,093,122
[45] Date of Patent: Jul. 25, 2000

[54] HYBRID SPRING FOR BICYCLE DERAILLEURS

[75] Inventors: Scott A. McLaughlin, Evanston; Brian T. Jordan, Chicago; Kevin F. Wesling, Lombard; John D. Cheever, Chicago, all of Ill.

[73] Assignee: SRAM Corporation, Chicago, Ill.

[21] Appl. No.: 09/005,214

[22] Filed: Jan. 9, 1998

[51] Int. Cl.[7] .............................. F16H 63/00; F16H 7/00
[52] U.S. Cl. ................................ 474/82; 474/80
[58] Field of Search ................. 474/78, 80, 81, 474/82; 280/260, 261

[56] References Cited

U.S. PATENT DOCUMENTS

| | | | |
|---|---|---|---|
| 5,518,456 | 5/1996 | Kojima et al. | 474/82 |
| 5,660,407 | 8/1997 | Adams | 474/82 |
| 5,695,421 | 12/1997 | Fukuda | 474/82 |
| 5,860,880 | 1/1999 | Oka | 474/82 |
| 5,897,451 | 4/1999 | Ichida | 474/82 |

*Primary Examiner*—David A. Bucci
*Assistant Examiner*—Matthew A. Kaness
*Attorney, Agent, or Firm*—Jefferson Perkins; Foley & Lardner

[57] ABSTRACT

A parallelogram link mechanism of a bicycle derailleur has a coil spring tensioned from a first axis of the parallelogram to another axis thereof that is diametrically opposed to the first axis. The coil spring exerts a primary spring force against the rider-supplied derailleur actuation force throughout the actuation range of the derailleur. A secondary member exerts a secondary force throughout a portion of the actuation range of the derailleur, producing a substantially constant resultant actuation force experienced by the rider. The secondary member can take various forms, including an abutment member which selectively abuts the coil spring at an angle to the spring axis; a second spring internal to the first; a member which is attached to spaced-apart coils of the coil spring to limit their linear expansion; and an internal member which limits constriction of a segment of the coil spring inwardly toward the spring axis.

36 Claims, 12 Drawing Sheets

HYBRID SPRING FOR BICYCLE DERAILLEURS

BACKGROUND OF THE INVENTION

1. Field of the Invention

This invention relates to derailleur-type bicycle gear shifting devices. More particularly, it relates to spring biased derailleur-type shifting devices exhibiting a desired biasing force curve.

2. Description of Related Art

Bicycle derailleurs are used to effect gear shifts by changing the position of a drive chain between the variable diameter sprockets of a multi-sprocket freewheel or crankset. The position of a chain on a sprocket of a freewheel or on a chainring of a crankset determines the gear ratio of the bicycle at which the rider must pedal. Typically, a derailleur includes a parallelogram link mechanism that is attached to a bicycle frame element at one end and to a chain guide at another end, the chain guide laterally urging the chain between the multiple sprockets or chainrings. A control cable is tied at one end to a shifter mounted proximate the rider's hand on the handlebar, or on the downtube of a bicycle frame and at the second end to the parallelogram. The parallelogram is typically spring biased in a given direction, requiring the rider to actuate the shifter and tension the control cable in order to deflect the parallelogram, and in turn urge the chain, in a direction opposite to the spring biased direction.

Figure 1:
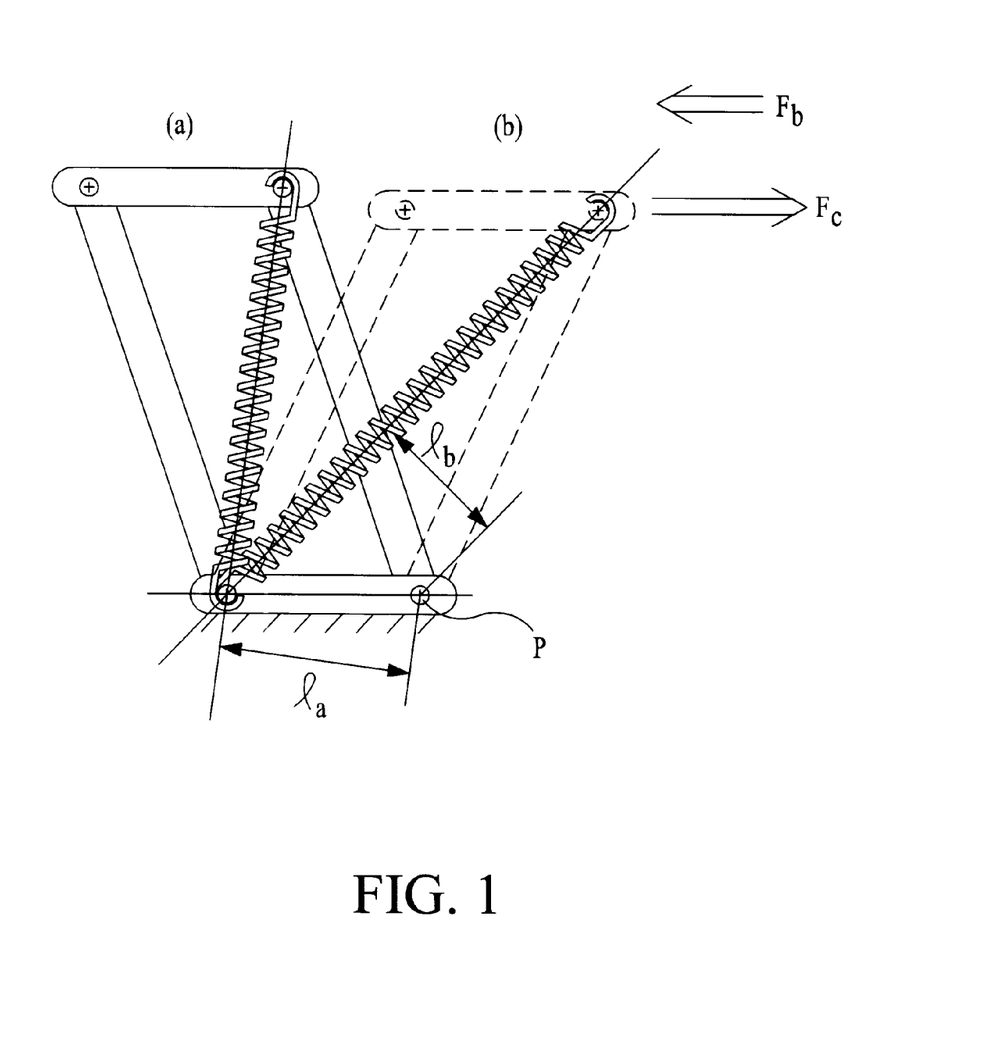
FIG. 1 is a schematic of the core elements making up a derailleur parallelogram in deflected and undeflected positions.
Figure 2:
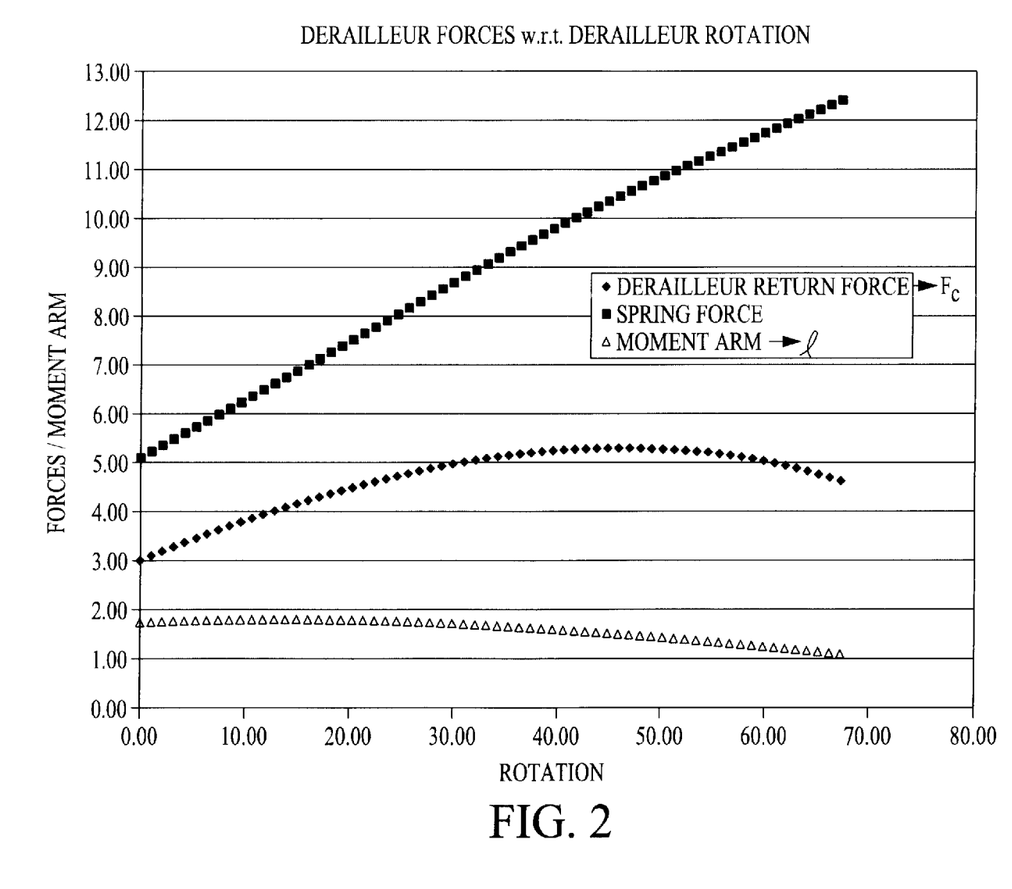
FIG. 2 is a plot of the biasing and spring forces and spring moment arm with respect to rotation of a parallelogram.

The return spring biasing the parallelogram is typically a helical or coil spring urging together diagonally opposed pivot points of the parallelogram. FIG. 1 illustrates a parallelogram that is deflected from position (a) to position (b) by an actuation of a cable force $F_c$ against the biasing force of a coil return spring. As the parallelogram is rotated or laterally deflected, the spring force increases; however, the moment arm over which it acts decreases from $l_a$ at undeflected position (a) to $l_b$ at deflected position (b). For approximately the first half of parallelogram movement, the spring force is increasing at a rate greater than the spring moment arm is decreasing producing an increasing biasing force $F_b$. However, for the second half of parallelogram movement, the spring moment arm progressively decreases at a rate greater than that of the still increasing spring force, producing a biasing force. FIG. 2 illustrates the progression of biasing and spring forces and spring moment arm over the actuation range of a typical parallelogram biased by a coil spring. Typically, a rear derailleur is spring biased toward the smaller diameter or higher gear sprocket. Shifting to a lower gear by urging the chain toward the smaller sprocket requires a generally uniform biasing force, but biasing force tension falls off when approaching the largest sprocket or lowest gear where shifting can be most critical.

Known prior art devices have included multiple spring combinations that increase the biasing force of a primary coil spring. Although the increased biasing force of such devices may counter the effects of spring fatigue, loss of lubrication, or contamination of the link mechanism by dirt or grit, the incremental increase in spring force entire range of parallelogram movement thereby failing to counter the effects of spring drop-off towards the latter half of derailleur movement. A need therefore exists for a derailleur producing a substantially constant actuation or biasing force over its range of movement.

SUMMARY OF THE INVENTION

It is an object of the present invention to provide a bicycle derailleur producing a substantially constant biasing force over its actuation range. It is another object of this invention to provide a derailleur producing a substantially constant biasing force over its actuation range without altering existing parallelogram link geometries and keeping within existing derailleur packaging limitations.

It is a further object of the present invention to provide a bicycle derailleur having multiple return forces, the derailleur adapted to stagger or time the introduction of the spring forces to achieve a desired biasing force over the derailleur range of movement.

The bicycle derailleur of the present invention includes a substantially parallelogram link mechanism displaceable over its range of motion by a biasing force, the biasing force working against a primary spring force resisting displacement of the derailleur for the full range of movement. A secondary spring force further resisting parallelogram displacement is introduced at an intermediate point to substantially eliminate the drop-off in the biasing force. The timed or staggered introduction of the secondary "booster" spring force ensures that a substantially constant biasing force can be achieved for the working range of derailleur movement.

According to one aspect of the present invention, the spring assist is provided by an additional spring that "kicks in" at an appropriate time to level off the biasing force curve. In such embodiments, separate springs provide separate spring forces to resist derailleur movement, the introduction of one spring force staggered with respect to the other, but nevertheless still cumulative.

According to another aspect of the invention a single spring is acted upon by a secondary member to produce two spring forces. Again, both spring forces are additive with one introduced later in the range of parallelogram movement to achieve a desired biasing force curve.

In one embodiment of the present invention, the ends of two concentric coil springs are attached about diagonally opposed pivot points of the parallelogram. At least one end of one of the coil springs, however, is slidably connected to one of the pivots forming a gap between the pivot and the spring end the direction of the spring axis in an undeflected parallelogram. The gap spacing is then designed to properly time the introduction of the second spring force to achieve a substantially constant biasing force.

In another embodiment of the present invention, the secondary spring force is produced by a torsion spring typically mounted about one of the parallelogram pivot points, the legs of the torsion spring extending to engage adjoining link members of the parallelogram. Again, in an undeflected parallelogram at least one leg of the torsion spring is spaced from its adjoining abutment surface located on one of the link members by a gap, the gap to be taken up during deflection of the parallelogram.

In a further embodiment of the present invention, an axial "lockout" member located coaxially about the coil spring loosely clasps individual spring coils at the upper and lower ends of the axial member. As the coil spring is stretched during deflection of the parallelogram, the slack in the direction of the spring axis between the axial member and the spring coils being taken up and causing the axial member to restrict further stretching of the spring segment circumscribed by the axial member. By preventing any further stretching of the captured spring segment, a secondary—and higher—spring rate is achieved by the single coil spring. Whereas a rigid axial member prevents further stretching of the captured spring segment, an axial member formed of an elastomeric material can be used to produce a lower spring rate. Additional spring rates can also be achieved by varying the number of spring coils circumscribed by the axial member.

In another embodiment of the present invention, a radial "lockout" member similarly restricts further extension of a segment of the coil spring, this time by preventing or cushioning further inward constriction of the spring coils as the coil spring is tensioned by the movement of the parallelogram. The radial member is suspended coaxially within the coil spring and is crushed by the natural inward constriction of the coils during extension of the spring along its axis. Again, by adjusting the elasticity of the radial member and its length, various higher secondary spring rates can be achieved with a single coil spring.

In yet another embodiment of the invention, opposed parallelogram axes are held apart by a coil spring under compression. In at least one segment of the coil spring, the coil pitch is reduced. As the parallelogram is deflected, the coils having the reduced coil pitch reach a point where they abut each other, causing the compression spring to exhibit a secondary and higher spring force as a whole.

In a further embodiment of the present invention, an abutment member, attached to on one of the link members forming the parallelogram or about one of the pivots, is urged against the coil spring during rotation of the parallelogram imparting a transverse force to the coil spring and laterally deflecting the coil spring. The application of a transverse load on the spring at an intermediate point of derailleur movement produces a secondary higher spring rate. By varying the size and elasticity of the abutment member and by varying its attachment point along any one of the parallelogram link members, a suitable biasing force can be achieved over the derailleur actuation range. Additionally, the abutment can be slidably attached to a link member allowing adjustment of the amount of lateral deflection imparted to the coil spring.

By adapting the parallelogram to vary the number and type of spring elements used, multiple "hybrid" spring combinations can be created to achieve the desired biasing force over the range of derailleur movement.

BRIEF DESCRIPTION OF THE DRAWINGS

Further aspects of the invention and their advantages may be discerned from reading the following detailed description when taken in conjunction with the drawings in which.

DESCRIPTION OF THE PREFERRED EMBODIMENTS

The bicycle derailleur of the present invention substantially eliminates or reduces the described disadvantages of prior art shifting systems. According to one aspect of the invention, by staggering or timing the introduction of the working range of multiple spring elements in a derailleur having a parallelogram link mechanism, a substantially constant biasing force is achieved over the actuation range of a derailleur.

Issued U.S. Pat. Nos. 5,533,937 and 5,620,383, commonly owned by the assignee of the present invention, fully describe the operation of derailleur-type shifting systems and are fully incorporated herein by reference.

Figure 3:
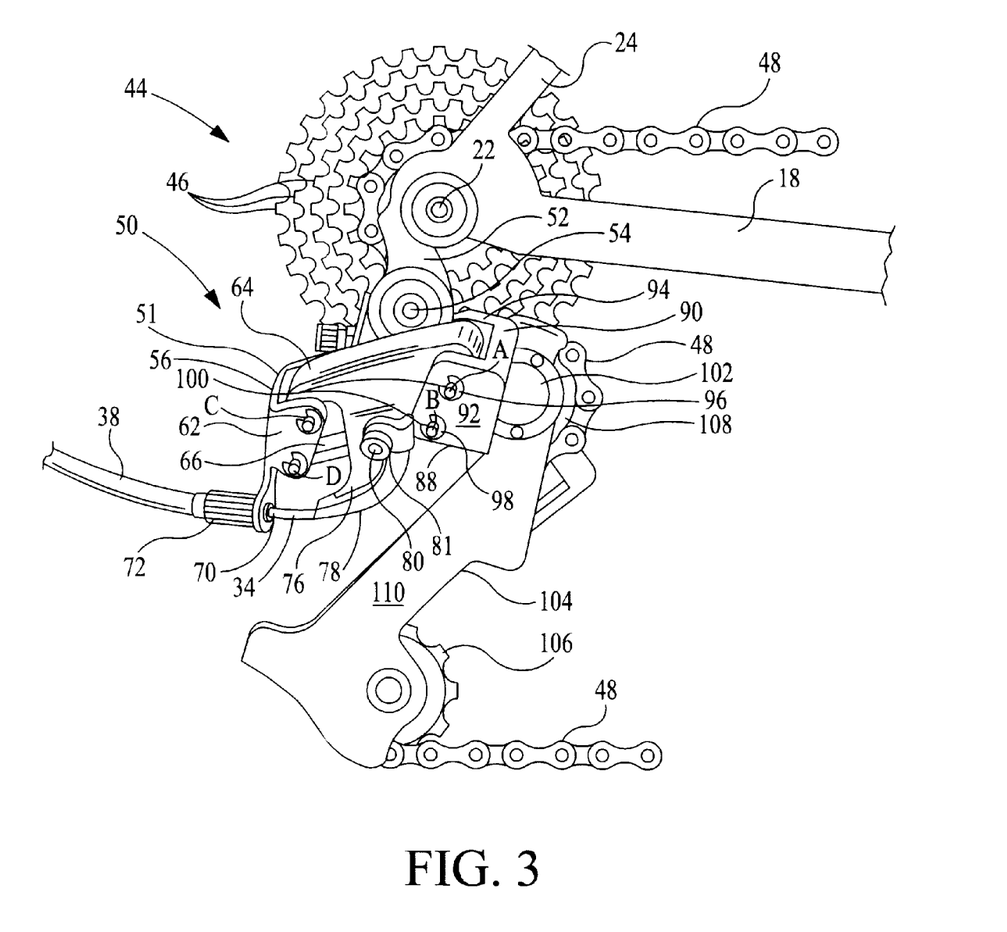
FIG. 3 is an elevational view of a rear derailleur attached to a bicycle frame.

Referring first to FIG. 3, a bicycle derailleur indicated generally at 50 is attached by a bolt 54 to a dropout member 52 of a bicycle frame 18. Derailleur 50 includes a parallelogram link mechanism 51 comprising a base member 56 (termed the "b-knuckle") attached at one end to the bicycle frame 18 at dropout 52, an end member 88 (termed the "p-knuckle") connected to a chain guide 110, an inboard sideplate 66 pivotally attached to b-knuckle 56 at pivot D and to p-knuckle 88 at pivot B, and an outboard sideplate 64 pivotally attached to b-knuckle 56 at pivot C and to p-knuckle 88 at pivot A. The chain guide 110 laterally urges a drive chain 48 between multiple sprockets 46 of a freewheel 44 at the rear wheel of the bicycle or between multiple chainrings of a crankset at the front derailleur (not shown) to effect gear shifts. Control cable 34, shown attached at one end to the outboard sideplate 64 at cable clamp 80, is attached at its other end to a rider-actuated shifter (not shown).

Figure 4:
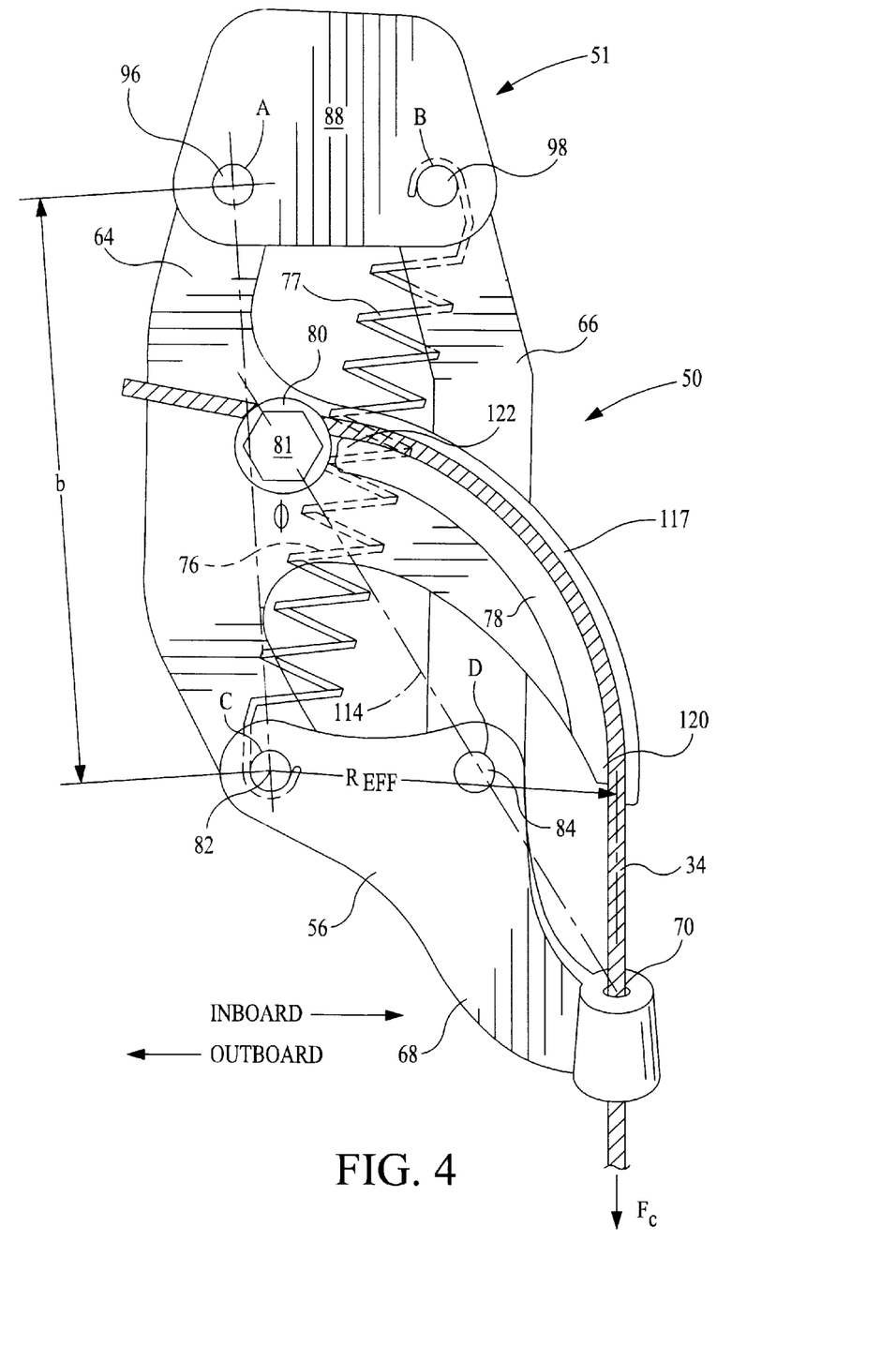
FIG. 4 is a detailed elevational view of the rear derailleur showing in particular the p-knuckle, b-knuckle, sideplates, and coil spring.

FIG. 4 is a detailed elevational view of the rear derailleur showing in particular the p-knuckle 88, the b-knuckle 56 and sideplates 64, 66 and a coil spring 77 connected about and drawing together pivot points B and C and biasing derailleur 50 in an outboard direction away from the bicycle frame 18. As shown in FIG. 4, parallelogram 51 is in its undeflected or outboard-most position, requiring the input of a biasing force $F_b$ in order to overcome the biasing force to deflect or rotate the parallelogram 51 to its inboard most position.

Figure 5:
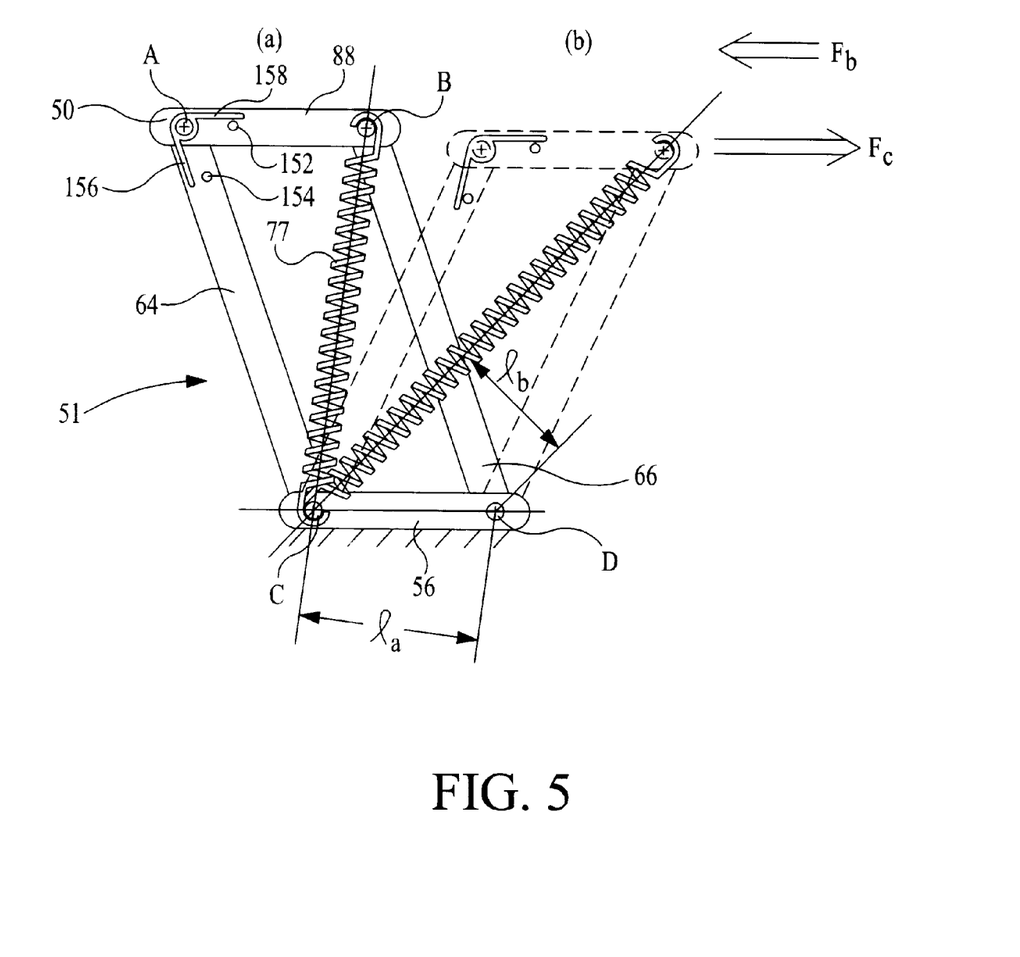
FIG. 5 is a schematic of the parallelogram according to the invention in deflected and undeflected positions embodying a secondary torsion spring.
Figure 6:
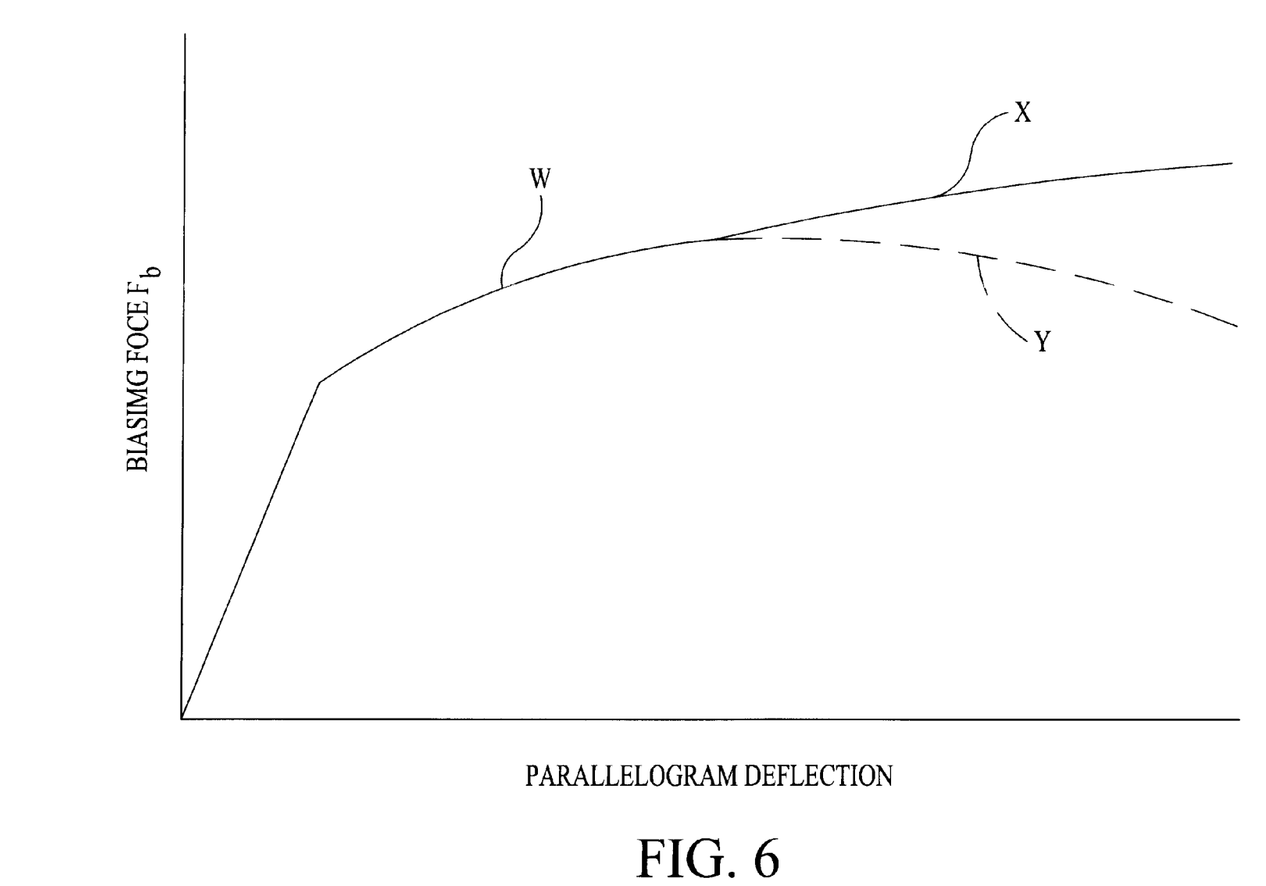
FIG. 6 is a plot of the biasing force curve with respect to parallelogram deflection

FIG. 5 schematically illustrates parallelogram 51 in undeflected and deflected positions (a) and (b), respectively. Furthermore, a torsion spring 150 is shown in undeflected position (a) wrapped about pivot A and loosely engaging p-knuckle 88 at peg 152 with a first leg 158, a second leg 156 of the torsion spring not contacting peg 154 of sideplate 64. Accordingly, at the onset of parallelogram deflection, coil spring 77 is tensioned but torsion spring 150 is not. As the parallelogram 51 is deflected, the force in coil spring 77 increases; however, the moment arm over which it acts decreases from $l_a$ at undeflected position (a) to $l_b$ at deflected position (b). For approximately the first half of parallelogram movement, the force in coil spring 77 increases at a rate greater than the rate at which the spring 77 moment arm is decreasing, producing an increasing biasing force $F_b$ that is required to be exerted by the rider (as depicted by line segment w in FIG. 6 to overcome the biasing force). However, for the second half of parallelogram deflection, the spring 77 moment arm progressively decreases at a rate greater than that of the still-increasing force in coil spring 77, producing a drop-off in the biasing force (as depicted by line segment y in FIG. 6). It is at this point in the actuation range of parallelogram 51 that torsional spring 150 is engaged or "kicks in" to provide an additional increment of spring assist to produce a substantially constant biasing force (as depicted by line segment x in FIG. 6). Torsion spring 150 becomes engaged when the gap existing between leg 156 of the torsional spring and peg 154 of sideplate 64 is taken up during deflection of the parallelogram 51 and both legs 156 and 158 of the torsional spring are pried open by pegs 154 and 152, respectively.

FIGS. 7 through 12 likewise schematically illustrate the range of movement of parallelogram 51, the parallelogram in each FIGURE embodying various spring combinations to achieve a desired biasing force curve.

Figure 7:
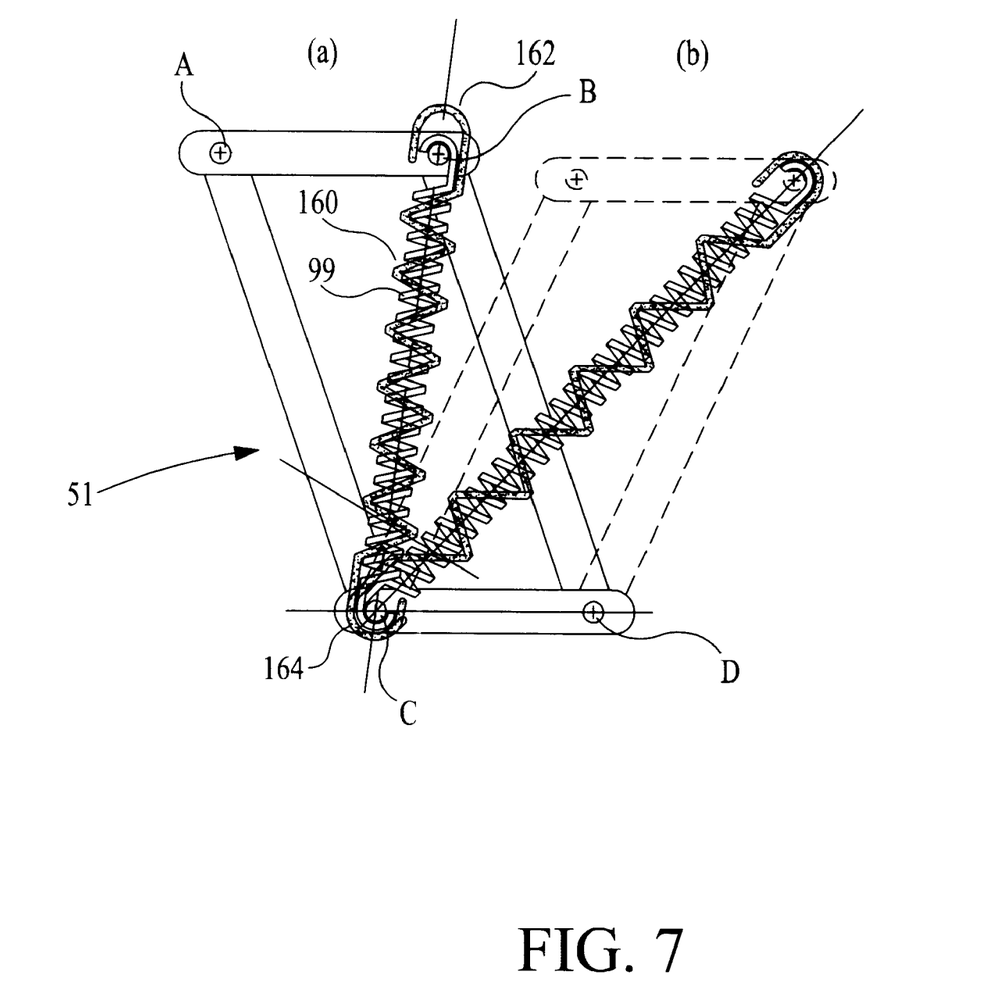
FIG. 7 is a schematic of the parallelogram according to the invention in deflected and undeflected positions embodying a secondary coaxial coil spring.

FIG. 7 depicts an additional embodiment of the invention employing a second coil spring 160 having a first end 164 connected about pivot B and a second end 162 slidably connected about pivot B along the spring axis. A gap is formed between spring end 162 and pivot C in the direction of the spring axis. At the onset of deflection of the parallelogram at position (a), primary coil spring 77 is tensioned and secondary coil spring 160 is not. At deflected position (b), both springs are tensioned. The gap spacing is designed to properly time the introduction of the force of spring 160 to supplement the force of spring 77 to achieve the desired biasing force over the derailleur range of movement.

Figure 8:
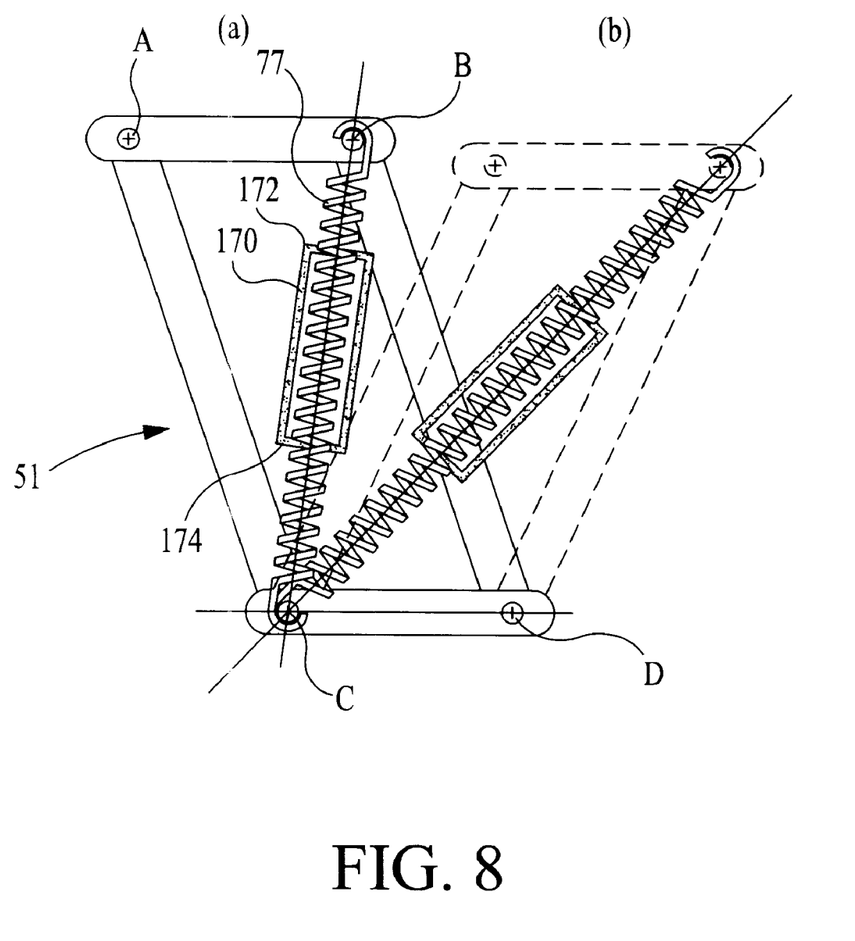
FIG. 8 is a schematic of the parallelogram according to the invention in deflected and undeflected positions embodying a secondary axial "lockout" member.

FIG. 8 depicts an additional embodiment of the invention employing a rigid axial "lockout" member 170 located coaxially about coil spring 77 and having upper and lower ends 172 and 174, respectively, the ends loosely clasping individual, spaced-apart coils of spring 77. At undeflected position (a), spring 77 is tensioned but axial member 170 is not. At deflected position (b), both spring 77 and axial member 170 are tensioned. At an intermediate parallelogram deflection position, between positions (a) and (b), as spring 77 is stretched, the coils of spring 77 adjoining ends 172 and 174, will abut the inner surface of ends 172 and 174 thereby preventing continued extension of the coils of spring 77 circumscribed or captured within axial member 170. Continued stretching of spring 77 beyond this point will cause only the remaining spring coils outside of axial member 170 to become extended, while the spacing between the coils inside axial member 170 will remain constant, assuming that axial member 170 is formed of a rigid material. If axial member 170 alternatively is formed of an elastomeric material then the spring coils captured inside axial member 170 will continue to stretch but at a reduced rate. By preventing any further stretching or reducing the amount of continued stretching of the captured spring segment, a secondary and higher spring rate is achieved by the single coil spring 77.

Figure 9:
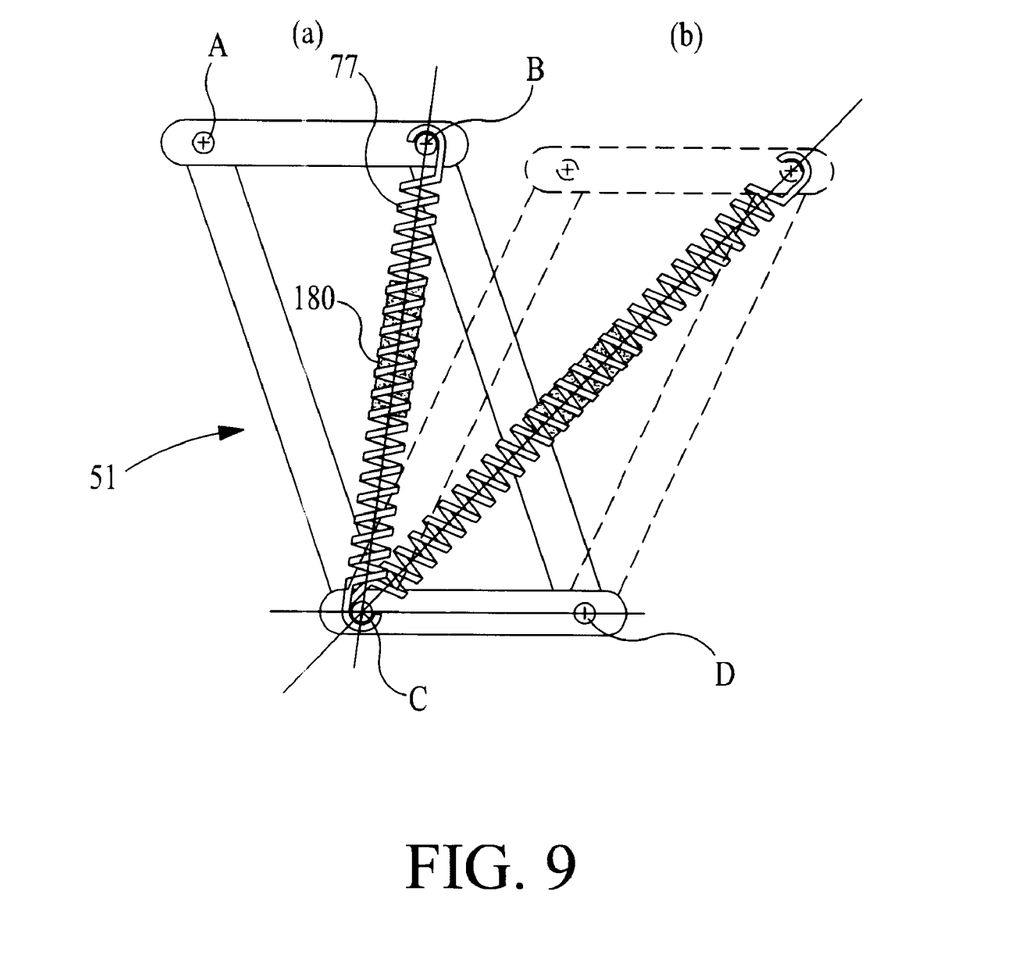
FIG. 9 is a schematic of the parallelogram according to the invention in deflected and undeflected positions embodying a secondary radial "lockout" member.

FIG. 9 depicts an additional embodiment of the invention employing a radial "lockout" member 180 that likewise restricts further extension of a segment of the coil spring. Radial member 180 is suspended coaxially within the coil spring 77 and is crushed by the natural inward constriction of the spring coils of a segment of spring 77 during extension of spring 77 along its spring axis, as shown in deflected position (b). At undeflected position (a), radial element 180 is not in contact with the inner surface of the coils of spring 77. At an intermediate parallelogram deflection position, between positions (a) and (b), as spring 77 is stretched, the coils of spring 77 adjacent radial member 180 will bear against radial member, thereby preventing continued extension of the coils of spring 77 in contact with radial member 10. Continued stretching of spring 77 beyond this point will cause only the remaining spring coils not in contact with radial member 10 to become extended, while the diameter of the coils bearing against radial member 180 remains constant if radial member 180 is constructed of a rigid material. Using a radial element 180 constructed of an elastomeric material will allow continued constriction of the diameter of spring 77 but at a reduced rate. By preventing any further stretching or by permitting only reduced stretching along the spring axis of the captured spring segment, a secondary and higher spring rate is achieved by the single coil spring 77.

Figure 10:
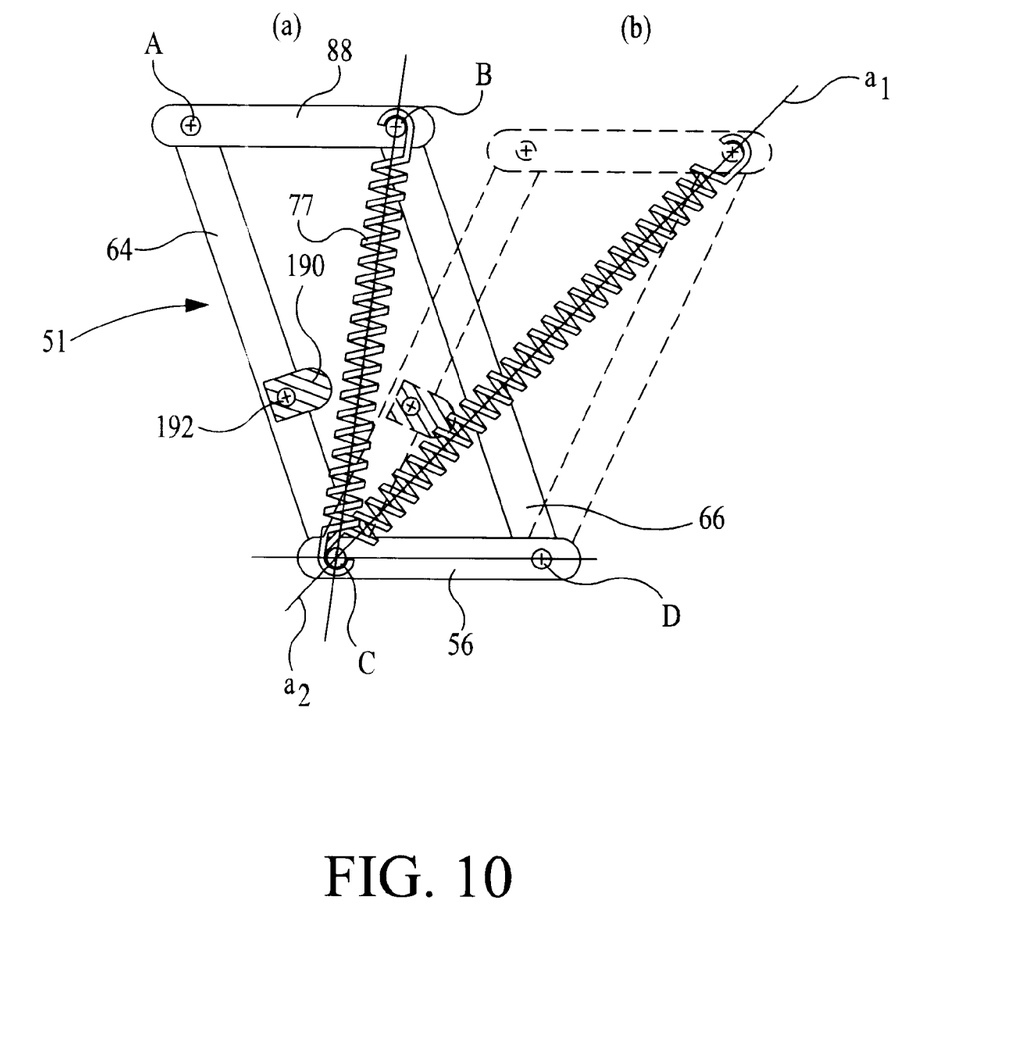
FIG. 10 is a schematic of the parallelogram according to the invention in deflected and undeflected positions embodying a secondary abutment member.

FIG. 10 depicts an additional embodiment of the invention employing an abutment member 190 shown attached to sideplate 64 with bolt 192. At undeflected parallelogram position (a), abutment member 190 is located adjacent to but is not in contact with spring 77. At deflected parallelogram position (b), abutment member abuts spring 77, forcing the spring to displace laterally and forming two spring axes a1 and a2. The application of a transverse load on the spring 77 by abutment member 190 produces a secondary and higher spring rate. By varying the size and elasticity of the abutment member, and by varying its attachment point along any one of the parallelogram link members, a suitable biasing force can be achieved over the derailleur actuation range. In additional embodiments, the abutment member 190 can be slidably attached to sideplate 64 or any of the other link members 56, 66 or 88 or attached about one of the pivots A, B, C, or D.

Figure 11:
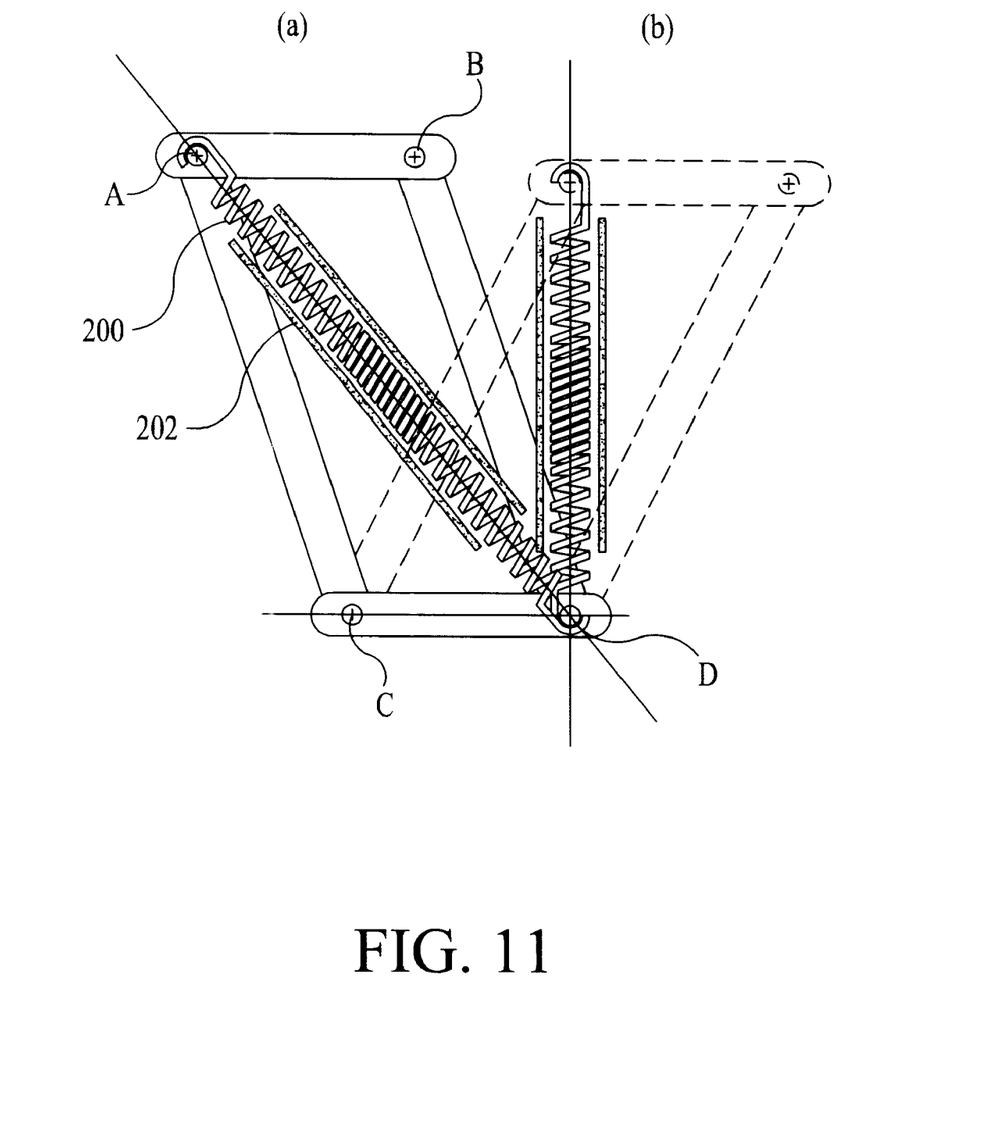
FIG. 11 is a schematic of the parallelogram according to the invention in deflected and undeflected positions embodying a primary compressive coil spring.

FIG. 11 depicts an additional embodiment of the invention employing a compression coil spring 200 connected about pivots A and D and coaxially encased within cylindrical housing 202 to prevent lateral buckling of the compression spring 200 under load. A segment z of compression spring 200 is formed with reduced pitch coils. In undeflected parallelogram position (a), spring 200 is not under compression or tension loading and the coils forming segment z of spring 200, albeit of reduced pitch, are not in contact with each other. In deflected position (b), the coils forming segment z are fully compressed. At an intermediate parallelogram deflection position, between positions (a) and (b), as spring 200 is being compressed along its entire length, the closer spacing of the coils forming segment z will necessarily bottom out against each other, while the remaining spring coils will continue to be compressed. By eliminating the number of coils being compressed, the continued compressive loading of the spring 200 will occur at a higher spring rate thereby achieving a secondary spring rate with only a single compressive spring member. By varying the number of coils within segment z different compressive spring rates can be achieved.

Figure 12:
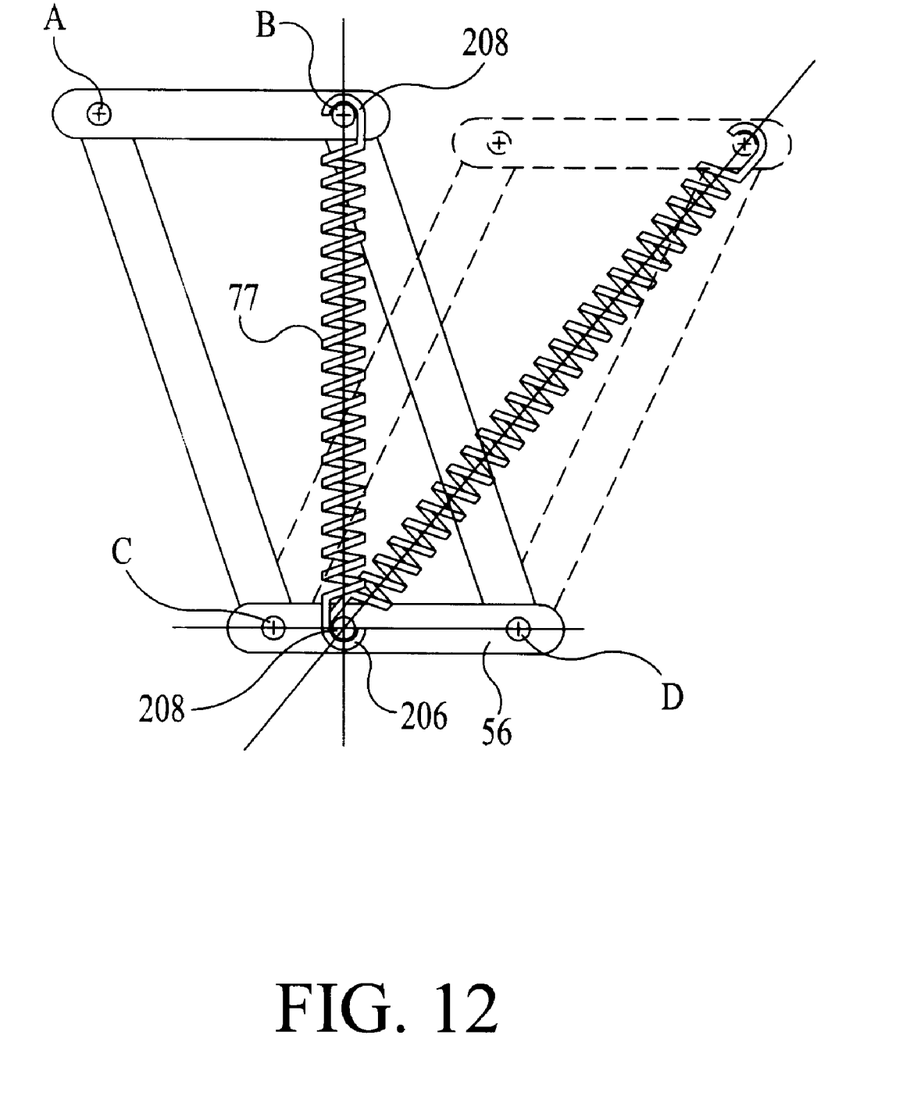
FIG. 12 is a schematic of the parallelogram according to the invention in deflected and undeflected positions embodying an attachment point for one end of the primary spring proximate a parallelogram pivot.

FIG. 12 depicts an additional embodiment of the invention employing a conventional coil spring 77 having a first end 206 attached to a peg 208 on link member 56 and a second end connected about pivot B. Using various pivot-to-pivot, pivot-to-link member, and link member-to-link member attachment points for the spring ends, will vary the orientation or slope of the standard spring curve shown in FIG. 2. Accordingly, various spring end attachment points can be used in combination with the various spring embodiments described above to achieve a desired biasing force curve.

Although numerous embodiments have been described, they are merely exemplary of the invention and are not to be construed as limiting, the invention being defined solely by the scope and spirit of the appended claims.

We claim:

1. A bicycle derailleur adapted to be attached to a bicycle frame element and to shift a drive chain between sprockets of a multi-sprocket drive assembly, the derailleur comprising:
    a substantially parallelogram-shaped link mechanism displaceable over an actuation range by a biasing force;
    a primary spring resisting displacement of the link mechanism over the actuation range; and
    at least a secondary member exerting a force which further resists displacement of the link mechanism solely over a portion of the actuation range, combined forces resisting displacement of the link mechanism and being produced by the primary spring and the second member.

2. A bicycle derailleur according to claim 1 wherein said primary spring is a first coil spring extensible along a spring axis.

3. A bicycle derailleur according to claim 2 wherein said secondary member is a second coil spring.

4. A bicycle derailleur according to claim 3 wherein the first coil spring is disposed coaxially with respect to the second coil spring.

5. A bicycle derailleur according to claim 3 wherein the second coil spring is disposed in an interior of the first coil spring.

6. A bicycle derailleur according to claim 2 wherein said secondary spring is a torsional spring.

7. A bicycle derailleur according to claim 2 wherein said secondary member an axial rigid member that engages at least a first coil of the coil spring and a second coil of the coil spring to prevent continued extension of the first coil spring between the first and second coils.

8. A bicycle derailleur according to claim 2 wherein said secondary member is an axial elastomeric member that engages at least a first coil of the first coil spring and a second coil of the first coil spring to further resist the extension of the first coil spring between the first and second coils.

9. A bicycle derailleur according to claim 2 wherein said secondary member is a radial rigid member that selectively engages a segment of the first coil spring to prevent further constriction of that segment toward the spring axis.

10. A bicycle derailleur according to claim 2 wherein said secondary member is a radial elastomeric member that selectively engages a segment of the first coil spring to prevent further constriction of that segment toward the spring axis.

11. A bicycle derailleur according to claim 2 wherein said secondary member applies a transverse load to the first coil spring in a direction substantially perpendicular to the spring axis to increase the spring force of the first coil spring solely along a portion of the derailleur actuation range.

12. A bicycle derailleur according to claim 11 wherein the secondary member comprises an abutment member attached to said link mechanism.

13. The bicycle derailleur of claim 1, wherein the combined forces produce a substantially constant actuation force over the link mechanism actuation range.

14. A bicycle derailleur comprising:
    a link mechanism including:
        a base member adaptable to be connected to a bicycle frame element;
        an end member connected to a chain guide operative to urge a drive chain between sprockets of a multi-sprocket drive assembly;
        a first link member pivotally attached to said base member about a first pivot axis and pivotally attached to said end member about a second pivot axis;
        a second link member pivotally attached to said base member about a third pivot axis and pivotally attached to said end member about a fourth pivot axis, said end member displaceable relative to said base member over an actuation range by an actuation force urging the first and fourth pivot axes apart from one another;
    a primary spring resisting the relative separation between the first and fourth pivot axes over the link mechanism actuation range; and
    at least a secondary member further resisting the relative separation between the first and fourth pivot axes solely over a segment of the link mechanism actuation range, combined forces resisting displacement of the link mechanism and being produced by the primary spring and the secondary member.

15. A bicycle derailleur according to claim 14 wherein said primary spring is a first coil spring extensible along a spring axis and having first and second ends linking the first pivot axis to the fourth pivot axis.

16. A bicycle derailleur according to claim 15 wherein said secondary member is a second coil spring having first and second ends also extending between the first and fourth pivot axes.

17. A bicycle derailleur according to claim 16 wherein the first coil spring is disposed coaxially with respect to the second coil spring.

18. A bicycle derailleur according to claim 16 wherein the second coil spring is disposed axially inwardly from the first coil spring.

19. A bicycle derailleur according to claim 15 wherein said secondary member is a torsional spring disposed about one of the pivot axes.

20. A bicycle derailleur according to claim 15 wherein said secondary member is an axial rigid member that engages a first coil of the first coil spring and at least a second coil of the first coil spring to prevent continued extension of the first coil spring between the first and second coils.

21. A bicycle derailleur according to claim 15 wherein said secondary member is an axial elastomeric member that engages a first coil of the first coil spring and at least a second coil of the first coil spring to further resist continued extension of the first coil spring between the first and second coils.

22. A bicycle derailleur according to claim 15 wherein said secondary member is a radial rigid member that radially engages a segment of the first coil spring to prevent constriction of that segment of the first coil spring toward the spring axis.

23. A bicycle derailleur according to claim 15 wherein said secondary member is a radial elastomeric member that radially engages a segment of the first coil spring to hinder constriction of that segment of the first coil spring toward the spring axis.

24. A bicycle derailleur according to claim 15 wherein said secondary member applies a transverse load to the first coil spring in a direction substantially perpendicular to the spring axis to increase the spring force of the first coil spring solely along a portion of the derailleur actuation range.

25. A bicycle derailleur according to claim 24 wherein the secondary member is an abutment member attached to said link mechanism.

26. A bicycle derailleur according to claim 25 wherein the abutment member is slidably attached to said link mechanism.

27. A bicycle derailleur according to claim 14 wherein said primary spring is a first coil spring extensible along a spring axis and having a first end connected to said link mechanism proximate the first pivot axis and a second end connected to said link mechanism proximate the fourth pivot axis.

28. A bicycle derailleur according to claim 14 wherein said primary spring is a first coil spring extensible along a spring axis and having a first end connected about the first pivot axis and a second end connected to the link mechanism proximate the fourth pivot axis, the second member comprising a second coil spring having a first end connected to the first pivot axis and a second end connected to the fourth pivot axis.

29. A bicycle derailleur according to claim 14 wherein said primary spring is a first coil spring compressible along a spring axis and having a first end connected to said link mechanism proximate the third pivot axis and a second end connected to said link mechanism proximate the second pivot axis.

30. The bicycle derailleur of claim 14, wherein the combined forces produce a substantially constant actuation force over the link mechanism actuation range.

31. In a bicycle gear shift device comprising a substantially parallelogram link mechanism attachable to a frame element and operative to shift a drive chain between sprockets of a multi-sprocket drive assembly, a method of shifting comprising the steps of:

displacing the substantially parallelogram link mechanism with a biasing force, the link mechanism being displaceable over an actuation range;

resisting the displacement with a primary spring force over the link mechanism actuation range; and further resisting the displacement with at least a secondary force solely over a portion of the actuation range.

32. The method of claim 31, wherein the resistance of the combined spring forces produce a substantially constant actuation force over the actuation range.

33. A bicycle derailleur comprising:

a substantially parallelogram link mechanism attachable to a bicycle frame element and operative to shift a drive chain between sprockets of a multi-sprocket drive assembly, the link mechanism displaceable over an actuation range;

means for exerting a primary spring force which resists the displacement of the link mechanism over the link mechanism actuation range; and means for exerting a secondary force which resists the displacement of the link mechanism solely over a portion of the actuation range.

34. The bicycle derailleur of claim 33, wherein the resistance of the primary and secondary forces produce a substantially constant actuation force over the actuation range.

35. A bicycle derailleur comprising:

a link mechanism including a base member adaptable to be mounted on a bicycle frame element, an end member coupled to a chain guide member adapted to urge a drive chain between sprockets of a multi-sprocket drive assembly;

a first link member pivotally attached to the base member about a first pivot axis and pivotally attached to the end member about a second pivot axis spaced from the first pivot axis;

a second link member pivotally attached to the base member about a third pivot axis spaced from the first pivot axis and pivotally attached to the end member about a fourth pivot axis spaced from the second pivot axis, the end member displaceable relative to the base member over an actuation range by an actuation force urging the first and fourth pivot axes apart from one another;

a primary coil spring tensioned between the first and fourth pivot axes of the link mechanism for resisting the actuation force over the actuation range; and a secondary member of the link mechanism coupled to the primary coil spring for further resisting the actuation force solely over only a portion of the actuation range.

36. A bicycle derailleur adapted to urge a drive chain between sprockets, the derailleur comprising:

a link mechanism including a base member, an end member of the link mechanism attached to a chainstay for guiding the drive chain, a first link member of the link mechanism pivotally attached to the base member about a first axis and pivotally attached to the end member about a second axis, a second link member of the link mechanism pivotally attached to the base member about a third axis displaced from the first axis and pivotally attached to the end member about a fourth axis displaced from the second axis;

a pivot of the derailleur adaptable to pivotally connect the base member of the link mechanism to a bicycle frame element;

the derailleur adaptable to be urged with an actuation force, a coil spring of the link mechanism disposed to resist the actuation force with and extensible along a spring axis; and an abutment member mounted on one of the link members and selectively engageable with the coil spring at an angle to the spring axis, the abutment member, while engaged with the coil spring, causing a change in the spring force exerted by the coil spring.

* * * * *